United States Patent
Eshraghian et al.

(10) Patent No.: US 8,266,466 B2
(45) Date of Patent: Sep. 11, 2012

(54) GLOBALLY SYNCHRONIZED TIMESTAMP VALUE COUNTER

(75) Inventors: Hamed Eshraghian, Lexington, MA (US); Werner Niebel, Hollis, NH (US); Matthew H. Harper, Salem, NH (US)

(73) Assignee: Cisco Technology, Inc., San Jose, CA (US)

( * ) Notice: Subject to any disclaimer, the term of this patent is extended or adjusted under 35 U.S.C. 154(b) by 757 days.

(21) Appl. No.: 11/804,821

(22) Filed: May 21, 2007

(65) Prior Publication Data

US 2008/0294926 A1 Nov. 27, 2008

(51) Int. Cl.
G06F 1/12 (2006.01)
(52) U.S. Cl. .................. 713/400; 713/500; 713/502
(58) Field of Classification Search .................. 713/375, 713/400, 500, 502
See application file for complete search history.

(56) References Cited

U.S. PATENT DOCUMENTS

| | | | |
|---|---|---|---|
| 6,449,291 B1 | 9/2002 | Burns et al. | |
| 6,618,815 B1 * | 9/2003 | Atkins et al. | 713/400 |
| 6,707,867 B2 | 3/2004 | Diepstraten et al. | |
| 6,763,016 B1 | 7/2004 | Teodorescu | |
| 6,973,029 B1 * | 12/2005 | Jantzen | 370/228 |
| 7,065,779 B1 | 6/2006 | Crocker et al. | |
| 7,113,484 B1 * | 9/2006 | Chapman et al. | 370/252 |
| 2002/0042844 A1 | 4/2002 | Chiazzese | |
| 2003/0067921 A1 | 4/2003 | Sivalingham | |
| 2003/0091035 A1 | 5/2003 | Roy et al. | |
| 2003/0177154 A1 | 9/2003 | Vrancic | |
| 2004/0047307 A1 | 3/2004 | Yoon et al. | |
| 2004/0095881 A1 * | 5/2004 | Borella et al. | 370/219 |
| 2005/0041666 A1 | 2/2005 | Hass | |
| 2005/0207387 A1 | 9/2005 | Middleton et al. | |
| 2006/0034320 A1 | 2/2006 | Ripy et al. | |
| 2006/0129706 A1 * | 6/2006 | Mueller | 710/22 |
| 2007/0058679 A1 | 3/2007 | Pelletier et al. | |
| 2007/0250648 A1 * | 10/2007 | Picard et al. | 710/9 |

OTHER PUBLICATIONS

International Search Report and Written Opinion issued for corresponding International Patent Application No. PCT/US2008/064323.

* cited by examiner

*Primary Examiner* — Paul Yanchus, III
(74) *Attorney, Agent, or Firm* — Wilmer Cutler Pickering Hale and Dorr LLP

(57) ABSTRACT

The present invention relates to a synchronized timestamp mechanism in a packet processing system. This synchronized timestamp mechanism provides a globally synchronized counter value so counters located on separate packet processing cards can be synchronized. The synchronizing of these packet processing cards provides tracking of how long it takes for packets to be processed, provides the ability to generate packet headers that include sequence numbers for robust header compression, and allows the use of encryption protocols without a time reference signal. The synchronization is provided by sending the cards with counter value information and this information can be used to update the card's internal counter value information so that the card is synchronized with other cards.

20 Claims, 3 Drawing Sheets

GLOBALLY SYNCHRONIZED TIMESTAMP VALUE COUNTER

FIELD OF THE DISCLOSURE

The present invention relates to a synchronized timestamp mechanism in a packet processing system.

BACKGROUND

A timestamp is an indication of when an event occurred. In computer systems, often a timestamp refers to Unix time, or the number of seconds since midnight Jan. 1, 1970 in coordinated universal time. A Unix time reference can be used to give a date and time in many different forms as well as to calculate an elapsed time between timestamps. The standard Unix timestamp is a signed integer data type and traditionally 32 bits. Being an integer data type means that the timestamp has a resolution of one second. In a signed integer 32 bit timestamp, a range of about 136 years in total is covered. The minimum representable time is 1901-12-13T20:45:52Z, and the maximum representable time is 2038-01-19T03:14:07Z.

SUMMARY

Certain embodiments feature a system comprising a plurality of cards residing in a chassis, the chassis running software that selects a master card from the plurality of cards, and the master card including a clock source and counter, wherein the master card transmits on two bus lines on a regular periodic basis counter value information to the plurality of cards including itself.

Some embodiments feature a method comprising designating one of a plurality of cards residing in a chassis to be a master, generating counter value information at the master and transmitting the counter value information to the plurality of cards, and updating at least one of the plurality of cards with the counter value information received from the master.

Certain embodiments feature a system comprising means for providing a plurality of cards residing in a means for providing a chassis, the means for providing a chassis running software that selects a master card from the means for providing a plurality of cards, and the master card including a clock source and means for providing a counter, wherein the master card transmits on two bus lines on a regular periodic basis counter value information to the means for providing a plurality of cards including itself.

DETAILED DESCRIPTION

Figure 1:
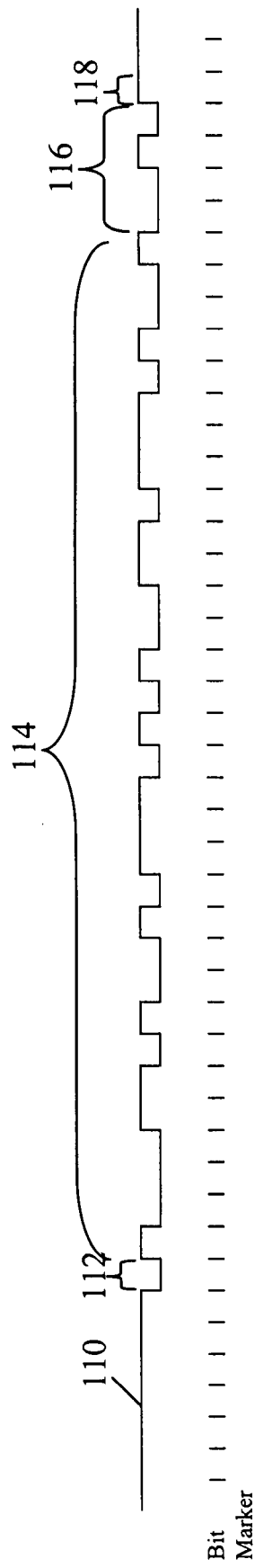
FIG. 1 is a diagram of a bit stream in accordance with certain embodiments of the invention.

Systems and methods for implementing a globally synchronized timestamp application in a distributed packet processing system are provided. The timestamp application can be implemented using a counter that is driven by a clock source in some embodiments. The synchronized counter can be a 32-bit counter that is synchronized across the distributed packet processing system. The synchronization can be accomplished in software, which designates a packet processing circuit board as a master and the rest of the packet processing circuit boards as slaves. The master can then asynchronously and serially transmit the value of its counter over two transmission lines at regular periodic intervals. The transmitted counter value can be compared against the slave counter value to keep all the cards synchronized. A globally synchronized timestamp value counter in a distributed packet processing system is useful in a number of situations.

First, the synchronized timestamp value counter can be used to time how long a packet takes to move through the system by tagging packets with a timestamp when they enter the system and when they leave the system. The difference between the two values yields a latency measurement. Various statistical techniques can then be applied to these values yielding values such as a minimum, a maximum, an average, and a standard-deviation packet latency, which are useful for Service Level Agreement (SLA) monitoring.

Another use for a globally synchronized timestamp value counter is to generate packet headers that include sequence numbers that are somehow related to time. For example, Robust Header Compression (see ROHC-RFC 3095 http://www.rfc-archive.org/getrfc.php?rfc=3095 and is hereby incorporated by reference herein in its entirety) defines a compression profile where packet headers include sequence numbers which are removed before transmission to reduce transmission size. To regenerate a packet on the receiving side, the ROHC decompression function requires an accurate time reference plus a ROHC decompression state record containing information for the flow telling how to convert the current time reference value back into a properly formatted packet header (including correct sequence number). A distributed packet processing system which performs ROHC processing, having a synchronized distributed time reference, permits the system to create the ROHC decompression state record in a location different than where the actual decompression function takes place.

The globally synchronized timestamp value counter can also be used for any protocol that has tight anti-replay or encryption mechanisms where the data stream does not incorporate an embedded time reference signal (e.g., encrypted DirectTV signals from satellites include embedded time information which is part of the key needed to decrypt the signal).

In some embodiments, the synchronized counter is a 32-bit counter that is synchronized across all packet processing cards plugged into a chassis. The chassis is further described below. A separate counter is kept on each card, which is locally incremented once every 80 ns (12.5 MHz) in some embodiments. The synchronization among all counters is accomplished by software in the chassis that designates a card as a master while the rest of the cards in the chassis are designated as slaves. The master asynchronously and serially transmits the value of its counter over 2 lines (called channel 0 and 1) once every 10.24 us (128×80 ns), in certain embodiments. These lines can be located in the mid-plane of the chassis. Both channels can carry identical information. The speed of the transmission can be at 12.5 MHz.

FIG. 1 illustrates an example of how counter information can be transmitted in certain embodiments of the invention. The master normally holds the line high 110. The transmission starts with a Start bit ('0') 112, which is followed by bits 31 (MSB) through 0 (LSB) of the counter value 114 and bits 3 (MSB) through 0 (LSB) of odd byte parity 116 and stops with a Stop bit ('1') 118. Parity bits 3, 2, 1 and 0 apply to data bits 31:24, 23:16, 15:8 and 7:0, respectively. By default all cards (including the master) receive from channel 0. If parity errors are detected on a channel, in some embodiments, software running on the card can direct the receiver to check what is received from the other channel.

In certain embodiments, the clock source used to generate the 12.5 MHz clock can be a non-temperature-compensated crystal oscillator that has an accuracy of +/−50 ppm (parts per million). Hence there is a maximum difference of 100 ppm (1250 Hz) between the clocks on the cards. As a result, during the 10.24 us interval between the reloading of the counters, the value of the counters on the slaves may only drift by a fraction (~0.0128) of one count. Due to this drift and the asynchronous nature of the transmission of the counter value, the maximum difference between any two counters in the chassis will be one clock period (80 ns).

Figure 2:
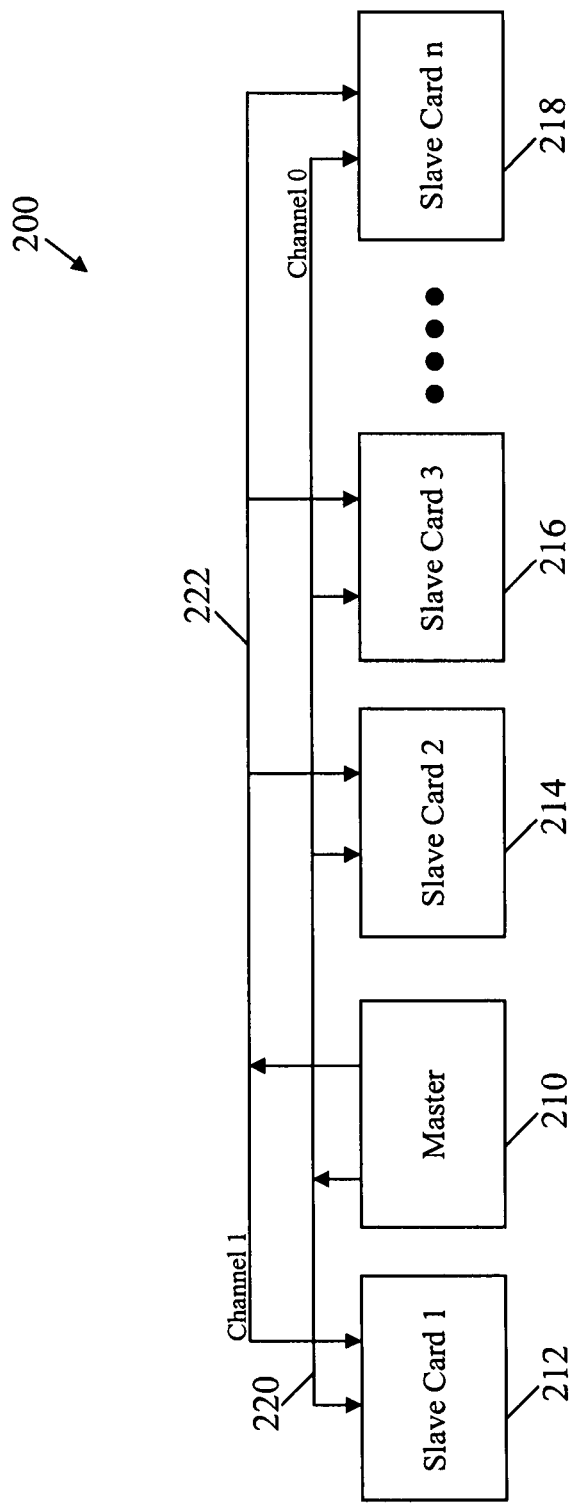
FIG. 2 is a schematic diagram of a master-slave card interconnect in accordance with certain embodiments of the invention.
Figure 3:
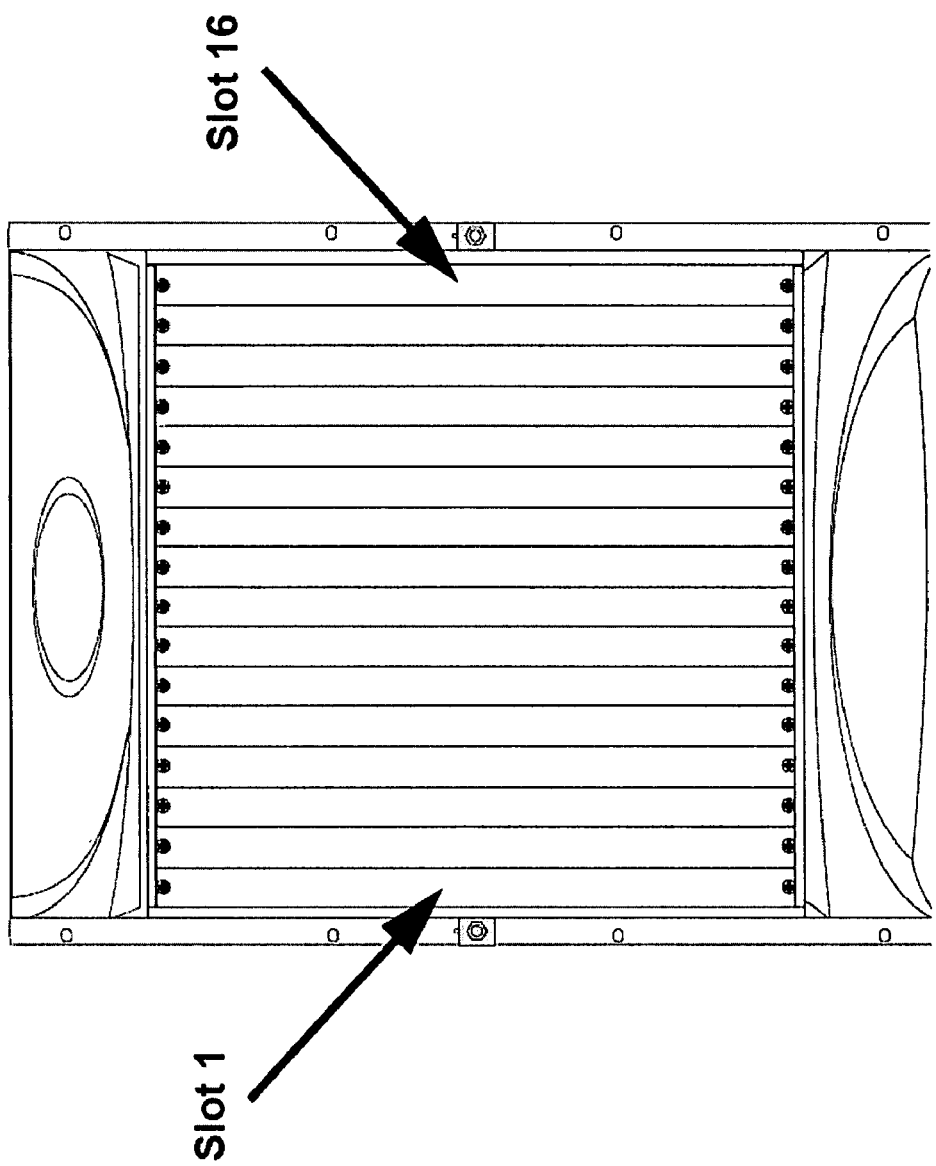
FIG. 3 is a diagram of a chassis with a number of cards installed in slots in accordance with certain embodiments of the invention.

FIG. 2 illustrates a logical master-slave card interconnect 200 in accordance with some embodiments of the invention. Master-slave card interconnect 200 includes a master 210, slave cards 212-218, and channels 220-222. If the designated master 210 goes down, the counters on the slaves 212-218 can continue running without synchronization until a new master has been designated by software running on the chassis. Since the counters are running on different clocks they may drift until the new master is operational. The master 210 and slave cards 212-218 can all be the same line card in some embodiments. This line card can be a Starent Networks, Corp. of Tewksbury, Mass. packet services card (PSC) for use in a ST16 or ST40 chassis. FIG. 3 illustrates a chassis with a number of cards installed in slots. The cards used in a chassis can be a packet accelerator card (PAC), a packet services card (PSC), a telephony services card (TAC), and a switch processing card (SPC), for example.

If a new slave is plugged into the chassis, it can take a maximum of 2 intervals (i.e. 2×10.24 us) for the counter on the slave to be synchronized to the master's counter.

Figure 4:
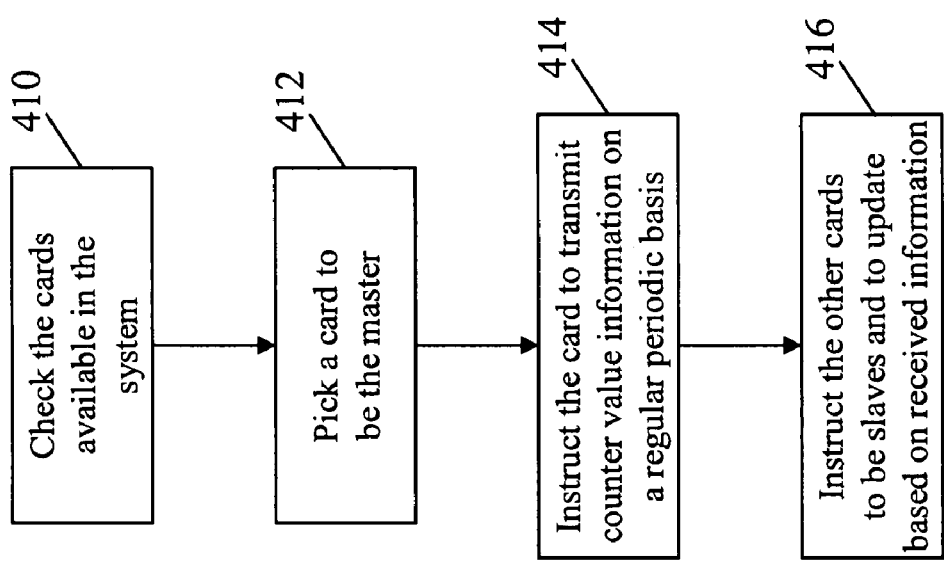
FIG. 4 is a process diagram for selecting a master in accordance with certain embodiments of the invention.

FIG. 4 illustrates an algorithm for selecting a master in accordance with certain embodiments of the invention. At 410, software checks the cards available in the system. One of the available cards is selected by the software to be the master in 412. The software instructs the card selected as the master to transmit counter value information on a regular periodic basis in 414. The counter value information can be transmitted over bus lines. The software, in 416, instructs the other cards to be slaves to update their counter values based on counter value information received from the master.

Figure 5:
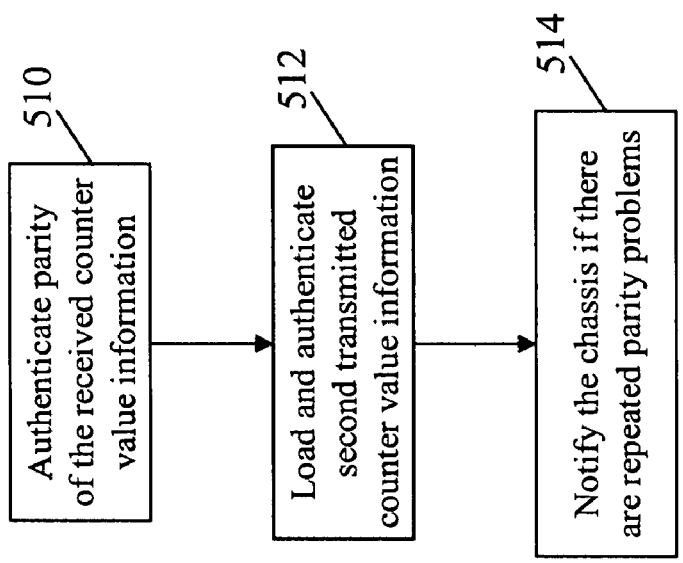
FIG. 5 is a process diagram for software in a card to handle parity problems in accordance with certain embodiments of the invention.

FIG. 5 illustrates an algorithm for software in a card to handle parity problems in accordance with certain embodiments of the invention. At 510, hardware in the card authenticates parity of the received counter value information. This can be accomplished by calculating the parity of the bits received for each group and comparing those with the parity calculated by the master. If any of the parity sections does not match, then the software is alerted of a problem. When parity errors occur frequently, the card software can select the transmitted counter value information from the second line (e.g., channel 1) and authenticate this information in 512. If there are repeated parity problems the card software can notify the chassis in 514. Depending on the notifications received from the cards, the chassis may be able to determine the problem. For example, if all of the slave cards are notifying the chassis of parity problems, then it is likely there is a problem with the master card. If a single card is encountering a problem, it is likely a problem with that card or that card's connection. Depending on the type of problem encountered, the chassis software can select another card to be master or can send an alert to the chassis operator regarding the problem.

In certain embodiments, time synchronization across geographically distributed locations or inter-chassis synchronization can be implemented. In some embodiments, an accurate time mechanism can be supplied by GPS to the group of chassis. The group of chassis can then exchange some offset value (of their counters) that is based on the common GPS time reference. The chassis can be a chassis that is providing inter-chassis redundancy such that one chassis can assume the functions and packet processing of the other chassis.

The time synchronization described above is implemented in a chassis in some embodiments. This chassis can implement multiple and different functionalities. In some embodiments, an access gateway, a packet data serving node (PDSN), a foreign agent (FA), or home agent (HA) can be implemented on a chassis. Other types of functionalities can also be implemented on a chassis in other embodiments are a Gateway General packet radio service Service Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device.

The features of a chassis that implements time synchronization, in accordance with some embodiments, are further described below. The chassis includes slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, or PDIF).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. A time synchronization system comprising:
a plurality of cards residing in a chassis, the chassis running software that selects, from the plurality of cards, a card to be the master card, the plurality of cards each including a clock source and a counter,
wherein the master card transmits on a first bus line, asynchronously and serially on a regular periodic basis, counter value information to the plurality of cards including to the master card,
wherein one or more of the plurality of cards includes one of a packet accelerator card, a packet services card, a telephony services card, and a switch processing card,
wherein one or more of the plurality of cards includes one of an access gateway, a packet data serving node, a foreign agent, a home agent, a base station, an access network, and a session control function, and
wherein the master card further transmits counter value information to the plurality of cards on a second bus line.

2. The system of claim 1, wherein each of the plurality of cards calculates parity of the counter value information and compares this parity with parity information calculated by the master card.

3. The system of claim 1, wherein the chassis is for providing a packet data serving node (PDSN).

4. The system of claim 1, wherein one of the plurality of cards updates its counter value with the counter value information received from the master card.

5. A method of synchronizing comprising:
designating one of a plurality of cards residing in a chassis to be a master card;
generating clock information and counter value information at the master and transmitting the counter value information to the plurality of cards on each of a first and a second bus line, including to the master card; and
updating at least one of the plurality of cards with the counter value information received from the master card,
wherein one or more of the plurality of cards includes one of a packet accelerator card, a packet services card, a telephony services card, and a switch processing card.

6. A method of synchronizing comprising:
designating one of a plurality of cards residing in a chassis to be a master card;
generating clock information and counter value information at the master and transmitting the counter value information to the plurality of cards on each of a first and a second bus line, including to the master card; and
updating at least one of the plurality of cards with the counter value information received from the master card,
further comprising generating a timestamp for tagging a packet using a counter at one of the plurality of cards that has been updated.

7. The method of claim 5, further comprising:
one of the cards other than the master card calculating parity information from the counter value information; and
comparing the calculated parity information with parity information received from the master card.

8. The method of claim 5, wherein the chassis is for providing a packet data serving node (PDSN).

9. A time synchronization system comprising:
means for providing a plurality of cards residing in a means for providing a chassis;
the means for providing a chassis running software that selects a master card from the means for providing a plurality of cards; and
the master card including a clock source and means for providing a counter, wherein the master card transmits on each of a first and a second bus line on a regular periodic basis counter value information to the means for providing a plurality of cards including the master card,
wherein the means for providing a chassis is for providing a packet data serving node (PDSN) functionality and wherein one or more of the means for providing a plurality of cards includes a packet accelerator card, a packet services card, a telephony services card, and a switch processing card.

10. The system of claim 9, wherein the means for providing a plurality of cards calculates parity of the counter value information and compares this parity with parity information calculated by the master card.

11. The system of claim 9, wherein one of the means for providing a plurality of cards updates its counter value with the counter value information received from the master card.

12. The system of claim 1, wherein the plurality of cards continues operating without synchronization with the master card if the master card becomes unavailable until a new master card is selected.

13. A time synchronization system comprising:
a plurality of cards residing in a chassis;
the chassis running software that selects, from the plurality of cards, a card to be the master card;
the plurality of cards each including a clock source and a counter,
wherein the master card further transmits counter value information to the plurality of cards on a second bus line,
wherein the master card transmits on a first bus line, asynchronously and serially on a regular periodic basis, counter value information to the plurality of cards including to the master card,
wherein each of the plurality of cards calculates parity of the counter value information and compares this parity with parity information calculated by the master card, and
wherein the plurality of cards sends a notification to the chassis when a parity problem occurs.

14. The system of claim 4, wherein the plurality of cards updates its counter value with the counter value information received from the master card on the second bus line when a parity problem occurs on the first bus line.

15. The method of claim 5, further comprising operating without synchronization with the master card at the plurality of cards if the master card becomes unavailable until a new master card is selected.

16. A method of synchronizing comprising:
designating one of a plurality of cards residing in a chassis to be a master card;
generating clock information and counter value information at the master and transmitting the counter value information to the plurality of cards on each of a first and a second bus line, including to the master card;
updating at least one of the plurality of cards with the counter value information received from the master card, one of the cards other than the master card calculating parity information from the counter value information;
comparing the calculated parity information with parity information received from the master card, and
sending a notification to the chassis when a parity problem occurs.

17. The method of claim 5, further comprising updating at least one of the plurality of cards with the counter value information received from the master card on the second bus line when a parity problem occurs on the first bus line.

18. The system of claim 9, wherein one of the means for providing a plurality of cards continues operating without synchronization with the master card if the master card becomes unavailable until a new master card is selected.

19. The system of claim 10, wherein one of the means for providing a plurality of cards sends a notification to the means for providing a chassis when a parity problem occurs.

20. The system of claim 11, wherein one of the means for providing a plurality of cards updates its counter value with the counter value information received from the master card on the second bus line when a parity problem occurs on the first bus line.

* * * * *